United States Patent
Watanabe

(10) Patent No.: US 8,423,221 B2
(45) Date of Patent: Apr. 16, 2013

(54) VEHICLE CONTROL DEVICE AND METHOD OF CONTROLLING VEHICLE

(75) Inventor: Takashi Watanabe, Gotemba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 60 days.

(21) Appl. No.: 13/256,803

(22) PCT Filed: Mar. 24, 2010

(86) PCT No.: PCT/IB2010/000657
§ 371 (c)(1),
(2), (4) Date: Sep. 15, 2011

(87) PCT Pub. No.: WO2010/109304
PCT Pub. Date: Sep. 30, 2010

(65) Prior Publication Data
US 2012/0004801 A1    Jan. 5, 2012

(30) Foreign Application Priority Data
Mar. 25, 2009    (JP) .................................. 2009-073387

(51) Int. Cl.
*B60W 20/00* (2006.01)

(52) U.S. Cl.
USPC .......................................................... 701/22

(58) Field of Classification Search ....................... 701/22
See application file for complete search history.

(56) References Cited

U.S. PATENT DOCUMENTS

| 5,224,335 A | | 7/1993 | Yoshizaki | |
|---|---|---|---|---|
| 5,444,976 A | * | 8/1995 | Gonze et al. | 60/274 |
| 5,555,725 A | * | 9/1996 | Shimasaki et al. | 60/277 |
| 5,645,745 A | * | 7/1997 | Hartwick et al. | 219/497 |
| 5,758,492 A | | 6/1998 | Kato et al. | |
| 5,950,419 A | * | 9/1999 | Nishimura et al. | 60/274 |
| 6,892,541 B2 | * | 5/2005 | Suzuki | 60/706 |
| 8,091,663 B2 | * | 1/2012 | Ichikawa | 180/65.265 |
| 8,209,970 B2 | * | 7/2012 | Gonze et al. | 60/303 |
| 2005/0268596 A1 | | 12/2005 | Abe | |
| 2009/0277705 A1 | | 11/2009 | Ichikawa | |

FOREIGN PATENT DOCUMENTS

| JP | A-8-210127 | 8/1996 |
|---|---|---|
| JP | A-8-338235 | 12/1996 |
| JP | A-10-2215 | 1/1998 |
| JP | A-10-288028 | 10/1998 |
| JP | A-2003-227366 | 8/2003 |
| JP | A-2004-183501 | 7/2004 |

OTHER PUBLICATIONS

International Search Report dated Jul. 19, 2010 in International Application No. PCT/IB2010/000657.
Written Opinion of the International Searching Authority dated Jul. 19, 2010 in International Application No. PCT/IB2010/000657.
Notification of Reasons for Refusal dated Mar. 1, 2011 in Japanese Patent Application No. 2009-073387 (with partial translation).

* cited by examiner

*Primary Examiner* — Thomas Tarcza
*Assistant Examiner* — Alex C Dunn
(74) *Attorney, Agent, or Firm* — Oliff & Berridge, PLC

(57) ABSTRACT

In a hybrid vehicle, an ECU executes drive control of an EHC. For the control, the ECU first executes low-voltage drive in which a drive voltage is reduced to 50 V when an energization request of the EHC is made. Then, based on a resistance value of the EHC, the ECU detects whether or not electric leakage is caused by dew formation of condensed water in the EHC. Consequently, if the electric leakage is detected, the energization of the EHC is inhibited. If electric leakage is not detected, the drive voltage Vd is increased to 200 V for normal drive to heat a catalyst by the EHC.

10 Claims, 6 Drawing Sheets

VEHICLE CONTROL DEVICE AND METHOD OF CONTROLLING VEHICLE

BACKGROUND OF THE INVENTION

1. Field of the Invention

The present invention relates to a control device for a vehicle that includes an electrically heated catalyst (EHC) and a method for controlling the vehicle.

2. Description of the Related Art

For example, Japanese Patent Application Publication No. 8-210127 (JP-A-8-210127) describes a device that prevents electric leakage in an EHC. An exhaust gas control apparatus for an internal combustion engine that is described in JP-A-8-210127 includes an upstream catalyst carrier with a heater function, a downstream catalyst carrier, and a bypass passage through which a portion of exhaust gases bypasses the upstream catalyst carrier and is guided to the downstream catalyst carrier. Accordingly, the temperature increase of the downstream catalyst carrier is promoted. In the above configuration, since a positive, electrode of the heater in the upstream catalyst carrier is positioned above the bypass passage, it is possible to prevent electric leakage that is caused by dew condensation water in the bypass passage that flows to the positive electrode.

In addition, for example, Japanese Patent Application Publication 8-338235 (JP-A-8-338235) describes a device in a hybrid vehicle. The device heats a catalyst when an electric power source for driving a motor needs to be charged in a situation where the motor is operated but an engine is not. The device then permits startup of the engine after a control unit determines that the catalyst has been heated to a temperature at which the catalyst is sufficiently activated.

Furthermore, for example, Japanese Patent Application Publication No. 2003-227366 (JP-A-2003-227366) describes a control device for a vehicle. In a hybrid vehicle, the control device energizes an EHC when the EHC is at low temperature, and starts up an engine even when the EHC is not activated as long as requested torque is equal to or larger than a specified torque.

Moreover, for example, Japanese Patent Application Publication No. 10-288028 (JP-A-10-288028) describes a hybrid vehicle in which an EHC is energized when an engine starts up due to a reduced state of charge (SOC) during a period when the vehicle is running in an electric vehicle (EV) mode.

Burnt gas in an internal combustion engine contains water as one of its components. Accordingly, when the internal combustion engine is left unoperated for a long period, dew is likely to be formed as a result of condensation especially in an exhaust passage of the internal combustion engine. Thus, when the internal combustion engine is started after such a relatively long unoperated period, the exhaust passage that includes the EHC is often subjected to a humid atmosphere. Specifically, in a vehicle with the EHC that is energized to promote heating of a catalyst, a favorable exhaust gas purification effect is easily obtained such as when the engine is started up from a cold state. Meanwhile, when the EHC is energized, a conductive state may be established between the EHC and the vehicle or between the EHC and the exhaust passage by condensed water, for example. Consequently, electric leakage may occur.

When the electric leakage occurs upon the energization of the EHC, or when the EHC is energized even in a situation where the electric leakage is likely to occur, a portion of electric power that is originally provided to heat the catalyst may be wasted. In addition, since the vehicle itself (i.e. a body or a chassis) or the exhaust passage can be electrically charged, a driver may get an electric shock by contacting the vehicle body while driving the vehicle, although a degree of shock may vary. Therefore, if the EHC is installed in the vehicle, it is essential to detect abnormality of the EHC.

In the device that is described in JP-A-8-210127, the electrodes are disposed in consideration of the possible electric leakage. However, such a measure in terms of hardware is insufficient to prevent the electric leakage or a crack in the exhaust passage that is primarily caused by the condensed water. In addition, since the device is developed on the basis of a technical idea that emphasizes prevention of an abnormality, it is difficult with the device to accurately detect the occurrence of the abnormality.

In the hybrid vehicle, and especially in a plug-in hybrid vehicle (PHV), an electric storage means such as a battery can appropriately be charged by an external electric power source. Thus, compared to a vehicle that only includes the internal combustion engine as a power source, the startup frequency of the internal combustion engine is significantly low in the hybrid vehicle or the PHV, and the internal combustion engine in the hybrid vehicle or the PHV is very likely to start from the cold state. For the above reason, an energizing request of the EHC may frequently be made, and a need for a measure to prevent the electric leakage may be significant. If the device that is described in JP-A-8-210217 is examined with the above issue in mind, the possible occurrence of the electric leakage is high in the hybrid vehicle in which dew is likely to be formed due to a lack of consideration that the device may be installed in the hybrid vehicle. With regard to the devices that are described in JP-A-8-338235, JP-A-2003-227366, and JP-A-10-288028, the EHC is adapted for use in the hybrid vehicle. In terms of exhaust gas purification, the technical idea to energize the EHC before and after a startup request of the internal combustion engine is made is beneficial. However, since such a technical idea is developed without any consideration of the electric leakage, it is impossible to prevent the electric leakage described above.

As it has been discussed so far, the above devices have a technical problem that it is difficult to prevent failure caused by the electric leakage if the EHC is installed in the vehicle. Needless to say, if only the prevention of the electric leakage is taken into consideration, the reduction in exhaust emissions upon startup of the internal combustion engine is not sufficiently achieved. In other words, failure that is caused by the electric leakage should be prevented without increasing the exhaust emissions.

SUMMARY OF THE INVENTION

The present invention provides a control device for a vehicle and a method for controlling a vehicle that prevent failure caused by electric leakage in an EHC while reducing exhaust emissions.

A first aspect of the present invention relates to the control device for a vehicle. This control device for a vehicle includes: an internal combustion engine; the EHC that is disposed in an exhaust passage of the internal combustion engine, that purifies exhaust gases introduced into the exhaust passage, and that is heated by energization; an energizing device that supplies electric power to the EHC; an identifying device that identifies at least one of a conductive characteristic of the EHC and a heat load condition of the EHC before the energizing device initiates the energization; a determining device that determines whether or not the EHC is in a specified electric leakage avoidance request state on the basis of the at least one of the specified conductive characteristic of the EHC and the specified heat load condition of the EHC;

and an inhibiting device that inhibits the energization when it is determined that the EHC is in the electric leakage avoidance request state.

The "internal combustion engine" according to the present invention is an engine that can convert fuel combustion into mechanical power, and is not limited to any physical, mechanical, and electric configurations in terms of fuel types, fuel supply modes, fuel combustion modes, configurations of an intake and exhaust system, and cylinder arrangements.

The "EHC" according to the present invention is a comprehensive concept of an exhaust gas control apparatus that has at least a function as a catalytic device for purifying the exhaust gases from the internal combustion engine and a function as a heater for heating the catalytic device by a heat generating property that is associated with the energization. For example, the EHC may adopt a configuration in which a catalyst carrier includes an electric resistor with relatively high electric resistance and thus the catalytic device itself has a heater function. Alternatively, the EHC may adopt a configuration in which the heater is disposed on an outer periphery of the catalyst carrier or closely disposed upstream or downstream of the catalyst carrier and heats the catalyst carrier with conductive heat or radiation heat.

A vehicle according to the present invention is provided with the energizing device. The energizing device is appropriately provided with various elements that can be adopted for the energization of the EHC and that include, for example, an electric circuit such as a current control circuit, a voltage control circuit, an electric power control circuit, a switching circuit, and a rectifier circuit as well as various electric wiring such as an electrode terminal and a wire harness.

According to the control device for a vehicle in the present invention, the identifying device identifies at least one of the conductive characteristic of the EHC and the heat load condition of the EHC before the energization is initiated to heat a catalyst. The determining device determines whether or not the EHC is in the specified electric leakage avoidance request state on the basis of at least one of the identified conductive characteristic of the EHC and the identified heat load condition of the EHC. The identifying device and the determining device can be a processing unit such as an electronic control unit (ECU), or a computer system such as a controller and a microcomputer.

In this specification, the "electric leakage" means that electric power, which is supplied to the EHC by the energization, affects the electric state of an element (i.e. a vehicle body or the exhaust passage) other than an element that is recognized in advance as a part of an energizing path. The "electric leakage avoidance request state" is a concept that includes a state in which the occurrence of the electric leakage inclusive of the above meaning is determined, assumed, or predicted as an actual phenomenon during the normal energization of the EHC to heat the catalyst, or a state in which the possible occurrence of the electric leakage is too high to overlook in a practical manner from a preventive standpoint.

The "conductive characteristic", which is identified by the identifying device and referred when the determining device determines the presence or absence of the electric leakage avoidance request state, is an electric characteristic with which behavior of the EHC before and after the initiation of the energization is recognized in advance. The "conductive characteristic" includes, for example, an electric resistance value of the EHC and a voltage (a potential difference from a reference potential) at an arbitrarily specified measurement point in the EHC or in a position near the EHC. Since the electric leakage is a phenomenon that can affect the electric state of the element other than the element on which the influence of the electric leakage can be predicted in advance, the conductive characteristic of the EHC is almost certainly changed by the electric leakage. Thus, the conductive characteristic is an extremely useful barometer to determine whether or not the EHC is in the electric leakage avoidance request state. The "identification" according to the present invention is a concept that includes detection, assumption, calculation, and acquisition, and a practical mode of the "identification" is not limited.

The "heat load condition", which is also identified by the identifying device, is a degree of a heat load applied to the EHC in the past or present that can determine a generative, residual, or adherent state of condensed water in the exhaust passage or the EHC. The "heat load condition" includes, for example, an exhaust temperature, an exhaust flow rate, a temperature of the EHC, or a continuous operation time of the internal combustion engine. As described above, the condensed water is one of the primary factors that cause the electric leakage. Thus, the "heat load condition" can also be a barometer to determine whether or not the EHC is in the electric leakage avoidance request state in a different perspective from the conductive characteristic. (Specifically, the conductive characteristic corresponds to the electric leakage as the actual phenomenon, while the heat load condition preferably corresponds to the possibility of the electric leakage from a preventive standpoint). Further, the combination of the heat load condition and the conductive characteristic as a determination element allows for more precise determination.

When the determining device determines that the EHC is in the electric leakage avoidance request state in accordance with one of or the combination of the conductive characteristic and the heat load condition that are identified through the operation of the identifying device, the inhibiting device inhibits the energization of the EHC to heat the catalyst. The inhibiting device can be a processing unit such as the ECU, or a computer system such as a controller or a microcomputer. The "inhibition" is a concept that includes to inhibit the energization and to limit an energizing condition during the energization in accordance with a specified standard. The specified standard is experimentally, empirically, or theoretically determined in advance, or is determined in advance on the basis of a simulation and the like that the continuous energization does not cause any trouble in a practical manner.

As described above, according to the control device for a vehicle in the present invention, the determining device determines with high accuracy whether or not the EHC is in the electric leakage avoidance request state before the initiation of the energization of the EHC to heat the catalyst. Then, based on a result of the determination, the energization of the EHC is inhibited at appropriate timing. Accordingly, it is possible to prevent the occurrence of failure that is caused by the electric leakage, and is also possible to favorably obtain the practical benefits with the EHC that inhibits emission deterioration.

The determining device according to the present invention adopts a configuration that allows for a binary determination on the presence or absence of the electric leakage avoidance request state. However, the electric leakage avoidance request state may be categorized into three or more stages. For example, the determining device may evaluate the possibility of the electric leakage during the energization in the multiple stages. In this case, the inhibiting device may reflect a degree of possibility to a degree of inhibition.

In the above aspect, the identifying device may identify the conductive characteristic upon application of a specified low voltage to the EHC.

According to the above configuration, it is determined whether or not the EHC is in the electric leakage avoidance state on the basis of the conductive characteristic of the EHC upon the application of the low voltage, which is identified by the identifying device. (Here, the drive control of the energizing device in relation to the application of the low voltage may be a part of the operation of the identifying device). Thus, it is possible to accurately determine the presence or absence of the electric leakage avoidance request state on the basis of the conductive characteristic as the actual phenomenon that is obtained from the EHC upon the application of the low voltage. In addition, various loads applied onto the EHC, various devices related to the EHC, the vehicle, a driver, or a passenger upon determination of the presence or absence of the electric leakage avoidance request state are relatively small. Thus, it is physically, mechanically, and electrically safe, simple, and easy.

The "specified low voltage" means that an absolute value of a voltage that is an electric potential difference from a reference electric potential is lower than a reference voltage that is determined in advance. However, the reference voltage is not limited to any value in the practice manner. For example, the reference voltage may be an applied voltage that is required for the energization of the EHC to heat the catalyst during the normal operation, may be a maximum voltage that the energizing device can apply, or may be a reference value that is defined under a regulation of a country or a region where the vehicle according to the present invention is utilized and that requires a structural measure for the application of a higher voltage than the reference voltage. For example, from the safety standpoint, if a border value of the voltage is 50 V under the regulation, and if the electric insulating structure that is required for the EHC has to be modified for the voltage over 50 V, the specified low voltage may be 50 V.

In the above configuration, the specified low voltage may be lower than a voltage at which the energization of the EHC is conducted to heat the catalyst.

As described above, when the specified low voltage is determined to be lower than the voltage during the energization of the EHC to heat the catalyst, it is possible to reliably cut the consumption of electric power that is required to detect the electric leakage.

In the above configuration, the conductive characteristic may be the electric resistance value of the EHC. The determining device may determine that the EHC is in the electric leakage avoidance request state when the identified electric resistance value is equal to or lower than a specified value.

When the EHC is subjected to the condensed water that is formed by condensation of water vapor in the exhaust gases, for example, and thus a certain degree of a conductive state is established between the EHC and a normally insulated point, the electric resistance value of the EHC is reduced at least in comparison with that in the normal state. Accordingly, when the electric resistance value of the EHC is equal to or lower than the specified value, it is possible to easily determine that the EHC is in the electric leakage avoidance request state.

The "specified value" may be the electric resistance value of the EHC in the normal state or a value that is determined experimentally, empirically, or theoretically, or on the basis of a simulation and the like and that can determine the occurrence of the electric leakage when the electric resistance value is lower than the electric resistance value in the normal state. In the present invention, "equal to or lower" or "equal to or higher" is a concept that can easily be replaced by "below" or "less than", or "above" or "more than", respectively, depending on how the reference value is determined. Thus, there is no influence on the essentiality of the present invention whether the reference value belongs to a region "below" or a region "above".

In the above configuration, the identifying device may identify a maximum value of the temperature of the EHC in a last operation period of the internal combustion engine as the heat load condition. The determining device may determine that the EHC is in the electric leakage avoidance request state when the identified maximum value is equal to or lower than a specified value.

A boiling point of the condensed water, which is produced from the exhaust gases and is one of the factors to cause the electric leakage in the EHC, is approximately 100° C. although the boiling point is affected by atmospheric pressure. Thus, when the vehicle is operated, the possibility that the temperature of the EHC or the temperature of the exhaust passage in communication with the EHC exceeds the boiling point of the condensed water is not low. In view of the above, when the maximum value of the temperature of the EHC is equal to or lower than the boiling point of the condensed water or the specified value that is higher than the boiling point of the condensed water in the last operation period of the internal combustion engine (an amount of water that causes the electric leakage is at least small in a non-operation period), regardless of whether the electric leakage actually occurs or not, it is possible to determine that the EHC is in the electric leakage avoidance request state in a preventive standpoint that the possible occurrence of the electric leakage is high.

In the above configuration, the identifying device may identify a duration of the last operation period of the internal combustion engine as the heat load condition. The determining device may determine that the EHC is in the electric leakage avoidance request state when the identified operation period is equal to or longer than a specified operation period.

The duration of the operation period of the internal combustion engine can define an amount of water vapor in the exhaust gases that is a constituent of the condensed water. Accordingly, for example, when the operation period is relatively long, the amount of the water vapor increases in comparison with a case where the operation period is relatively short. Therefore, it is possible to determine that the possibility of the electric leakage is high. Further, if such a concept is combined with a concept regarding the determination on the presence or absence of the electric leakage avoidance request state based on the above temperature of the EHC, it is also possible to make the highly accurate determination on the electric leakage avoidance request state in multiple stages by coordinately referring to the amount of the water vapor that is proportional to the operation period and the amount of evaporated water vapor that is proportional to the temperature of the EHC.

In the above configuration, the identifying device may identify the electric resistance value of the EHC and the temperature of the EHC respectively as the conductive characteristic and the heat load condition. The determining device may determine that the EHC is in the electric leakage avoidance request state when the identified electric resistance value is equal to or lower than the specified value, and when the identified temperature is equal to or higher than the specified value.

As described above, when the temperature of the EHC is in a high temperature region where the condensed water that is formed on the EHC or the exhaust passage in communication with the EHC can sufficiently be evaporated, the possibility of the electric leakage that is caused when the EHC gets wet or is subjected to the humid atmosphere is reduced. Thus, when the electric resistance value of the EHC is still reduced in a situation where the influence of the electric leakage by the condensed water can be eliminated, it is possible to at least determine that the EHC is in the abnormal state regardless of a cause of the reduction in the electric resistance value. In this case, the abnormal state may include some sort of the electric leakage avoidance request state that is caused by a factor with little relation to the condensed water (such as a crack on the EHC). Alternatively, the abnormal state may include another physical, mechanical, electric, or chemical failure of the EHC. Regardless of the factor that causes the abnormal state, the energization of the EHC should preferably be inhibited by a fail-safe mechanism.

Therefore, according to this aspect, it is possible to take a safety measure not only on the abnormality of the EHC, which should be deeply concerned, such as the electric leakage by the condensed water but also on the abnormalities of the EHC in a wider sense. This is extremely beneficial in a practical manner as high reliability of the EHC can be assured.

In the above configuration, the vehicle is a hybrid vehicle that includes: at least one rotating motor that functions as a power source in conjunction with the internal combustion engine; and a rechargeable electric storage device that functions as an electric power source of the rotating motor. The electric power that is required for the energization may be supplied from the electric storage device.

This type of the hybrid vehicle can be operated by power supplied from the rotating motor to a drive shaft. In addition, the operation frequency of the internal combustion engine in this vehicle is at least lower than that in a vehicle without the rotating motor as a main power source or an assist power source. Accordingly, the internal combustion engine is likely to start from a cold state, and thus, the energizing request of the EHC may frequently be made. That is, the control device for a vehicle according to the present invention can yield substantial benefits when installed in this type of the hybrid vehicle.

It is understood that when the electric storage device such as a hybrid battery, which is configured to function as a power source of the rotating motor, can be recharged by an external electric power source (in other words, the hybrid vehicle adopts the configuration of a so-called plug-in hybrid), the above benefits are even more significant. In this case, the energizing device can adopt any of various configurations in accordance with a physical, mechanical, or electrical connection among the external electric power source, the electric storage device; and the EHC. For example, when one of supply passages of the external electric power goes through the electric storage device while the other does not go through the electric storage device, a switching device that switches between the above supply passages may be provided as a preferred embodiment. Alternatively, when the external power source is not directly connected to the EHC, external electric power may be divided between an electric system that guides the external electric power to the electric storage device and an electric system that supplies the electric power from the electric storage device to the EHC.

A second aspect of the present invention is related to a method for controlling a vehicle that includes: an internal combustion engine; an EHC that is disposed in an exhaust passage of the internal combustion engine, that purifies exhaust gases guided into the exhaust passage, and that is heated by energization; and an energizing device that supplies electric power to the EHC. The method for controlling a vehicle includes: identifying at least one of a conductive characteristic of the EHC and a heat load condition of the EHC before the energizing device initiates the energization; determining whether or not the EHC is in a specified electric leakage avoidance request state on the basis of at least one of the identified conductive characteristic of the EHC and the identified heat load condition of the EHC; and inhibiting the energization when it is determined that the EHC is in the electric leakage avoidance request state.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
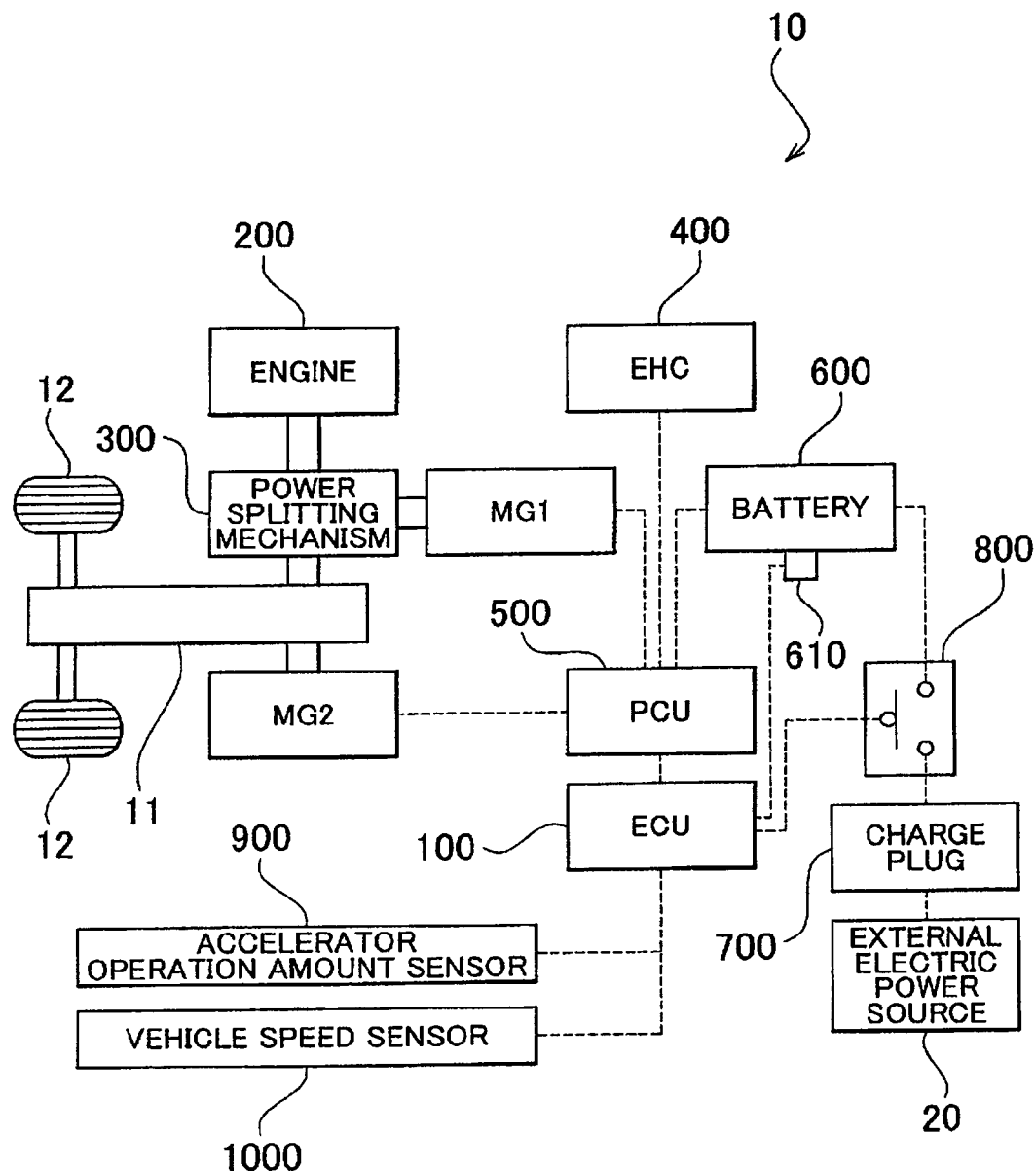
FIG. 1 is a schematic block diagram that that shows the configuration of a hybrid vehicle according to a first embodiment of the present invention.

Embodiments of the present invention will be described with reference to the drawings. A hybrid vehicle 10 according to a first embodiment of the present invention will be described with reference to FIG. 1. FIG. 1 is a schematic block of the configuration of the hybrid vehicle 10.

The hybrid vehicle 10 in FIG. 1 is an example of the "vehicle" and the "hybrid vehicle" according to the present invention, and includes a speed reduction mechanism 11, a wheel 12, an ECU 100, an engine 200, a motor generator MG1 (hereinafter abbreviated as "MG1" accordingly), a motor generator MG2 (hereinafter abbreviated as "MG2" accordingly), a power splitting mechanism 300, an EHC 400, a power control unit (PCU) 500, a battery 600, a charge plug 700, a relay circuit 800, an accelerator operation amount sensor 900, and a vehicle speed sensor 1000.

The speed reduction mechanism 11 is a gear mechanism that includes a differential gear (not shown) and the like and that can be rotated in accordance with power output from the engine 200 and the motor generator MG2. The speed reduction mechanism 11 is configured to reduce rotational speeds of such power sources, which are the engine 200 and the motor generator MG2, based on a specified reduction ratio. An output shaft of the speed reduction mechanism 11 is connected to an axle (whose reference numeral is omitted) of the hybrid vehicle 10. The power from each of the power sources is transmitted to the axle and the wheel 12, which is a drive wheel connected to the axle, at the reduced rotational speed.

The speed reduction mechanism 11 is not limited to any specific configuration as long as power that is supplied from each of the engine 200 and the motor generator MG2 is transmitted to the axle while the rotational speed of a shaft is reduced on the basis of the transmitted power. The speed reduction mechanism 11 may adopt a configuration that simply includes the differential gear and the like, or may adopt a so-called reduction mechanism that includes a plurality of clutches, a brake, and a planetary gear train to obtain a plurality of gear ratios.

The ECU 100 is an electronic control unit that includes a central processing unit (CPU), a read only memory (ROM), a random access memory (RAM) and the like, and that controls the entire operation of the hybrid vehicle 10. The ECU 100 is an example of the "control device for a vehicle" according to the present invention. The ECU 100 executes evaporation promotion control, which will be described later, in accordance with a control program that is stored in the ROM.

The ECU 100 integrally functions as examples of the "identifying device", the "determining device", and the "inhibiting device" according to the present invention, and executes operations of these devices. It should be noted that physical, mechanical, and electric configurations of the above devices according to the present invention are not limited to the above. For example, each of the above devices may be configured as a computer system that includes a plurality of the ECUs, various processing units, various controllers, or a microcomputer.

Figure 2:
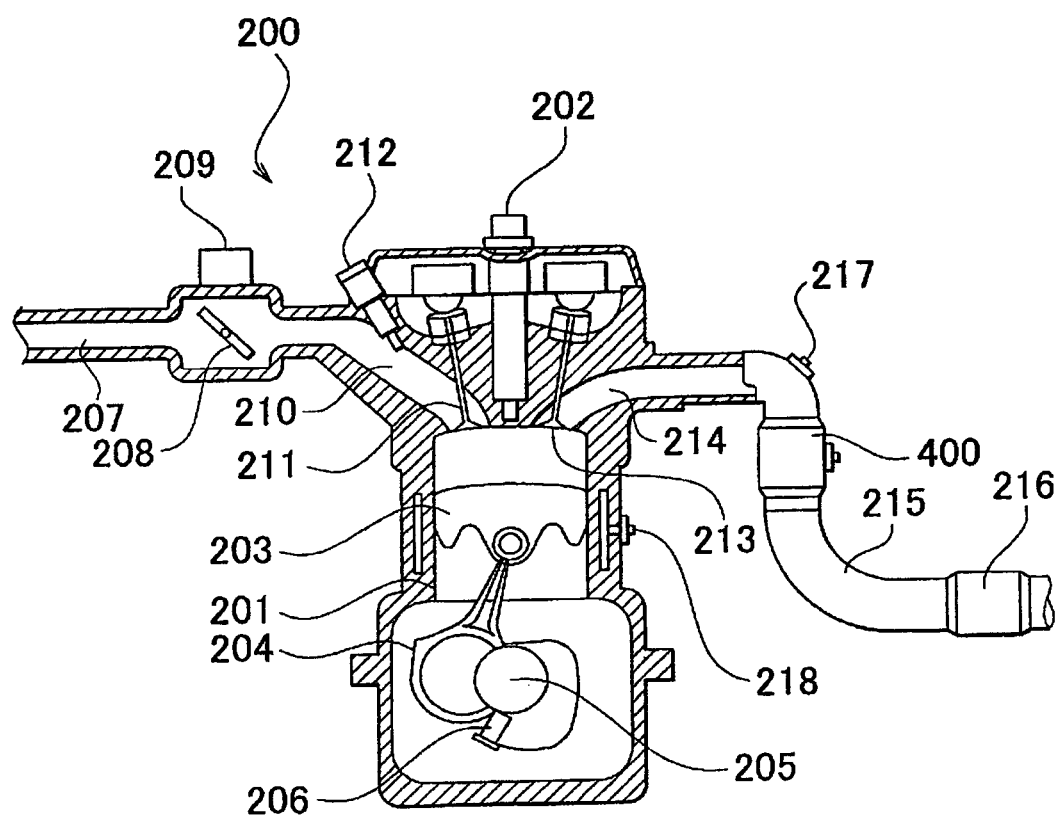
FIG. 2 is a cross-sectional view that illustrates a configuration of an engine that is installed in the hybrid vehicle of FIG. 1.

The engine 200 functions as a power source of the hybrid vehicle 10. The engine 200 is a gasoline engine that is an example of the "internal combustion engine" according to the present invention. Now, referring to FIG. 2, the engine 200 will be described in detail. FIG. 2 is a cross sectional view that illustrates the configuration of the engine 200. In FIG. 2, the same components as those in FIG. 1 are denoted with the same reference numerals, and their description is not repeated.

In the engine 200, of FIG. 2, air-fuel mixture is ignited and burnt by an ignition device 202 in which a portion of a spark plug (whose reference numeral is omitted) is exposed in a combustion chamber of a cylinder 201, and reciprocal motion of a piston 203 that is generated by an explosive force produced from combustion of the air-fuel mixture is converted to rotational motion of a crankshaft 205 through a connecting rod 204. A crank position sensor 206 that detects a rotational position (i.e. a crank angle) of the crankshaft 205 is disposed near the crankshaft 205. The engine 200 is an inline four-cylinder engine in which the four cylinders 201 are arranged in series in a direction perpendicular to the plane of FIG. 2. Since all the cylinders 201 adopt the same configuration, only one of the cylinders 201 will be described with reference to FIG. 2.

The "internal combustion engine" according to the present invention can adopt any of various configurations in terms of fuel types, fuel supply modes, fuel combustion modes, cylinder arrangements, and the like. For example, the "internal combustion engine" is not limited to a gasoline engine that is exemplified in this embodiment, but may be a diesel engine that uses petrodiesel as fuel or a bi-fuel engine that uses mixed fuel of alcohol and gasoline. Even when the "internal combustion engine" is a gasoline engine, the cylinder arrangement is not limited to the inline type.

In the engine 200, intake air from the outside passes through an intake pipe 207 and is mixed at an intake port 210 with fuel that is sprayed from an injector 212 to produce the air-fuel mixture. The fuel is stored in a fuel tank (not shown) and pressure-fed to the injector 212 through a delivery pipe (not shown) by operation of a feed pump (not shown). A fuel injection device need not be an injector of a so-called intake port injection type. For example, the fuel injection device may be a so-called direct injector or the like. In this case, a pressure of the fuel that is pressure-fed by the feed pump or another low-pressure pump is further increased by a high-pressure pump, and the fuel is then directly sprayed into the high-temperature, high-pressure cylinder 201.

The communication between the inside of the cylinder 201 and the intake pipe 207 is controlled by an intake valve 211. The air-fuel mixture that is burnt in the cylinder 201 becomes exhaust gases and is guided to an exhaust pipe 215 through an exhaust port 214 when an exhaust valve 213 that operates in conjunction with the intake valve 211 is opened. The exhaust pipe 215 is an example of the "exhaust passage" according to the present invention.

In the intake pipe 207, the intake air is introduced through a cleaner (not shown), and a throttle valve 208 that adjusts an amount of the intake air is disposed upstream of the intake port 210. A drive state of the throttle valve 208 is controlled by a throttle valve motor 209 that is electrically connected to the ECU 100. The drive of the throttle valve motor 209 is basically controlled by the ECU 100 such that a throttle opening amount that corresponds to an accelerator operation amount Ta can be obtained. Here, the accelerator operation amount Ta is detected by the accelerator operation amount sensor 900. At this time, a driver does not take an active role in the drive control of the throttle valve motor 209 (of course, the drive control is not executed against the driver's will), and the throttle opening amount may be adjusted automatically. In other words, the throttle valve 208 is configured as an electrically controlled throttle valve.

A three-way catalyst 216 is disposed in the exhaust pipe 215. The three-way catalyst 216 is an exhaust gas control apparatus in which a basic carrier such as alumina carries a rare metal such as platinum, which has a cross section of a honeycomb shape in a direction parallel to a radial direction of the exhaust pipe 215, and which concurrently conducts a reduction reaction of nitrogen oxides ($NO_x$) in the exhaust gases and an oxidation reaction of carbon monoxide (CO) and hydrocarbon (HC) in the exhaust gases to purify the exhaust gases.

An air-fuel ratio sensor 217 that detects the exhaust air-fuel ratio in the engine 200 is disposed in the exhaust pipe 215. The air-fuel ratio sensor 217 is electrically connected to the ECU 100. The ECU 100 refers to the detected air-fuel ratio at constant or variable intervals. In a water jacket that is disposed in a cylinder block for housing the cylinder 201, a coolant temperature sensor 218 is disposed to detect a temperature of a long life coolant (LLC) that is circulated to cool the engine 200. The coolant temperature sensor 218 is electrically connected to the ECU 100. The ECU 100 refers to a detected coolant temperature at constant or variable intervals.

Figure 3:
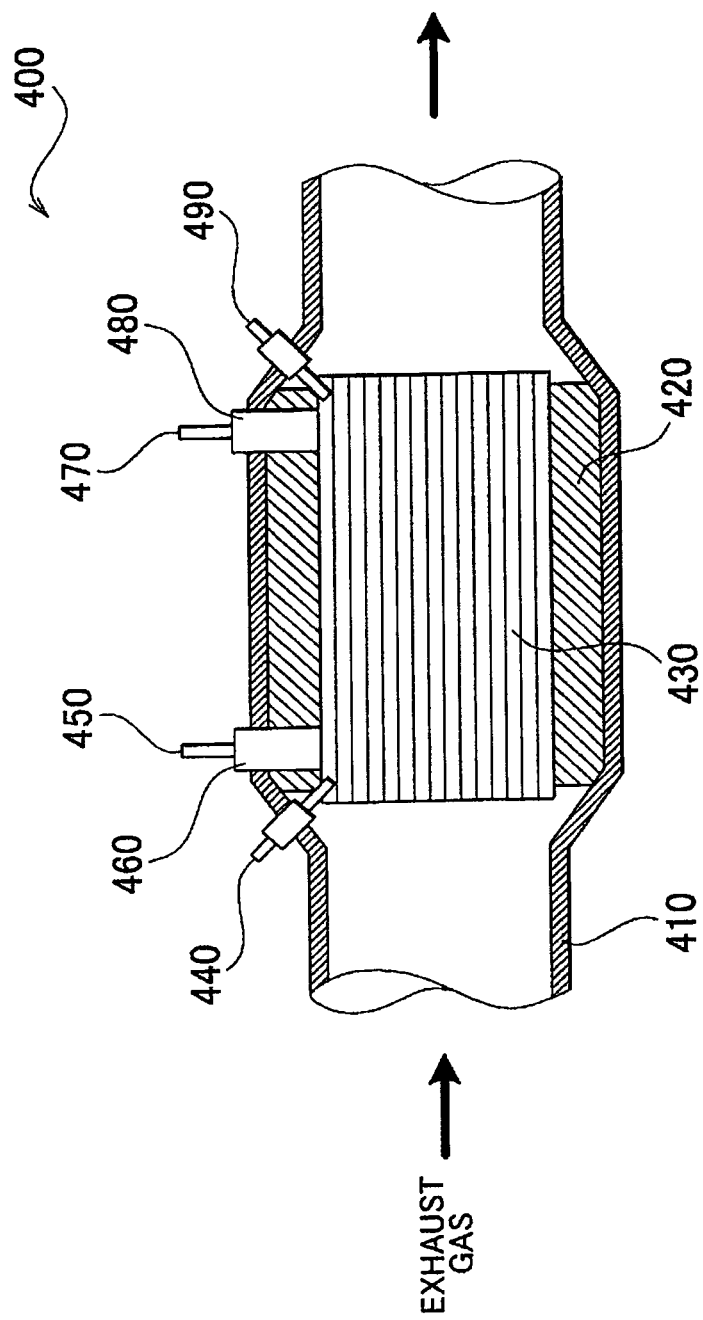
FIG. 3 is a schematic cross-sectional view shows a configuration of an EHC in the engine of FIG. 2 in a direction that an exhaust pipe extends.

The engine 200 includes an EHC 400 in the exhaust pipe 215 upstream of the three-way catalyst 216. Here, the EHC 400 will be described with reference to FIG. 3. FIG. 3 is a schematic cross sectional view that illustrates a configuration of the EHC 400 in a direction that the exhaust pipe 215 extends. In FIG. 3, the same components as those in FIG. 2 are denoted with the same reference numerals, and their description is not repeated.

In FIG. 3, the EHC 400 is an electrically heated catalytic device that is an example of the "EHC" according to the present invention, and includes a case 410, a heat insulating member 420, an EHC carrier 430, a temperature sensor 440, a positive electrode 450, a positive electrode film 460, a negative electrode 470, and a negative electrode film 480.

The case 410 is a housing for the EHC 400 and is formed from a metal material. The case 410 is connected to the exhaust pipe 215 at both upstream and downstream ends of the case 410 through connecting members (not shown).

The heat insulating member 420 is disposed to cover an inner peripheral surface of the case 410, and has an electric insulating property in addition to a heat insulating property.

The EHC carrier 430 is a conductive catalytic carrier that has a cross section of a honeycomb shape in a radial direction of the case 410. The EHC carrier 430 carries an oxidation catalyst (not shown) and purifies the exhaust gases that pass through the EHC 400. A catalyst that is carried by the EHC carrier 430 may be a three-way catalyst. In this case, an amount of the rare metal contained in this catalyst may differ from the amount of the rare metal contained in the three-way catalyst 216, which is located downstream of the EHC 400. The engine 200 may have another catalytic device such as a $NO_x$ storage reduction (NSR) catalyst in addition to or instead of the three-way catalyst 216.

The positive electrode 450 is an electrode that applies a positive voltage, and one end of the positive electrode 450 is fixed near an upstream end of the EHC carrier 430 in regard to the exhaust gas flow. The other end of the positive electrode 450 is connected to the PCU 500, which will be described later. A portion of the positive electrode 450 is covered by the positive electrode film 460, which is made of resin and has the electric insulating property. The positive electrode film 460 maintains an electric insulating state between the case 410 and the positive electrode 450.

The upstream temperature sensor 440 is attached to the EHC carrier 430 in a position near the positive electrode 450, and detects a temperature of the position that is an upstream EHC temperature Tehc1. The upstream temperature sensor 440 is electrically connected to the ECU 100. The ECU 100 refers to the detected upstream EHC temperature Tehc1 at constant or variable intervals.

The negative electrode 470 provides a reference potential, and one end of the negative electrode 470 is fixed near a downstream end of the EHC carrier 430 in regard to the exhaust gas flow. The other end of the negative electrode 470 is connected to the PCU 500, which will be described later. A portion of the negative electrode 470 is covered by the negative electrode film 480, which is made of resin and has the electric insulating property. The negative electrode film 480 maintains an electric insulating state between the case 410 and the negative electrode 470.

A downstream temperature sensor 490 is attached to the EHC carrier 430 in a position near the negative electrode 470, and detects a temperature of the position that is a downstream EHC temperature Tehc2. The downstream temperature sensor 490 is electrically connected to the ECU 100. The ECU 100 refers to the detected downstream EHC temperature Tehc2 at constant or variable intervals.

In the EHC 400 that is configured as described above, when a positive drive voltage Vd is applied to the positive electrode 450 on the basis of the potential of the negative electrode 470, the conductive EHC carrier 430 carries current and generates heat consequently. This heat generation accelerates a temperature increase of the oxidation catalyst that is carried by the EHC carrier 430, and the EHC 400 is immediately transitioned to a catalyst activation state.

The configuration of the EHC 400, which is described above, is merely an example. Any of various known modes can be adopted for the configuration of the EHC carrier and the attachment and control modes of each of the electrodes.

In the EHC 400, a material with relatively high electric resistance (i.e. a ceramic material) is used for the EHC carrier 430 to obtain a sufficient thermal capacity. In order to sufficiently heat the EHC carrier 430 with a large thermal capacity, the applied voltage tends to be high. In the EHC 400, with a supply of electric power from the PCU 500 that has the battery 600 as an electric power source and will be described later, the drive voltage Vd is set relatively high at approximately 200 V during a normal operation to heat the catalyst.

Referring again to FIG. 1, the motor generator MG1 functions as a generator that charges the battery 600 or that supplies the electric power to the motor generator MG 2. The motor generator MG1 also functions as a motor that assists the engine 200.

The motor generator MG2 is an example of the "rotating motor" according to the present invention. The motor generator MG2 functions as a motor that assists the engine 200 or as a generator that charges the battery 600.

The motor generator MG1 and the motor generator MG2 are configured, for example, as synchronized electric motor generators, and each includes: a rotor that has a plurality of permanent magnets on an outer peripheral surface thereof; and a stator around which a three-phase coil is wound to form a rotating magnetic field. However, each of the motor generator MG1 and the motor generator MG2 may be a different type of the motor generator.

The power splitting mechanism 300 is a planetary gear train that can split the power of the engine 200 between the MG1 and the axle. The power splitting mechanism 300 can adopt any of various known configurations, and thus is not described herein in detail. In a brief description, the power splitting mechanism 300 includes: a sun gear provided in a center portion; a ring gear that is provided above an outer periphery of the sun gear in a concentric manner; a plurality of pinion gears that are disposed between the sun gear and the ring gear, rotates and revolves on the outer periphery of the sun gear; and a planetary carrier that is connected to an end of the crankshaft 205 and supports a rotational shaft of each of the pinion gears.

The sun gear is connected to the rotor (whose reference numeral is omitted) of the MG1 through a sun gear shaft, while the ring gear is connected to the rotor (not shown) of the MG2 through a ring gear shaft. The ring gear shaft is connected to the axle, and thus the power generated by the MG2 is transmitted to the axle through the ring gear shaft. Similarly, a drive force from the wheel 12 that is transmitted through the axle is received by the MG2 through the ring gear shaft. In the power splitting mechanism 300, which is configured as described above, the power generated by the engine 200 is transmitted to the sun gear and the ring gear by the planetary carrier and the pinion gears, and is split into two systems. When the split power that is transmitted to the sun gear drives the motor generator MG1 for positive rotation, the motor generator MG1 generates the electric power.

The PCU 500 is a power control unit that includes an inverter (not shown). The inverter converts direct-current (DC) power from the battery 600 to alternating-current (AC) power, and supplies the AC power to the motor generator MG1 and the motor generator MG2. The inverter also converts the AC power generated by the motor generator MG1 and the motor generator MG2 to the DC power, and supplies the DC power to the battery 600. The PCU 500 controls power input/output between the battery 600 and the motor generator MG1 or the motor generator MG2, or controls power input/output between the motor generator MG1 and the motor generator MG2 (in this case, the power is input and output between the motor generator MG1 and the motor generator MG2 without involving the battery 600). The PCU 500 is electrically connected to the ECU 100, and the operation of the PCU 500 is controlled by the ECU 100.

The PCU 500 is also electrically connected to the positive electrode 450 of the EHC 400, and can supply the direct drive voltage Vd to the positive electrode 450. A drive current Id that corresponds to the direct drive voltage Vd is generated in the EHC carrier 430. Then, in response to heat quantity W (W=IR$^2$) that is produced by the drive current Id and electric resistance R of the EHC carrier 430, the EHC carrier 430 generates heat. In other words, the PCU 500 is an example of the "energizing device" according to the present invention. This PCU 500 includes a DC/DC converter and can supply not only a high voltage of 200 V that is the direct drive voltage Vd during the normal operation described above but also a low voltage of 50 V or below. These types of the voltage increase and decrease are also controlled by the ECU 100.

In this embodiment, the PCU 500 is an example of the "energizing device" according to the present invention. However, the energizing device is not limited to any particular configuration as long as it can energize the EHC 400 (through the positive electrode 450 and the negative electrode 470 in this embodiment). For example, the hybrid vehicle 10 may include a secondary voltage supply device as an example of the "energizing device" according to the present invention. The secondary voltage supply device increases a primary voltage that is supplied from the electric storage device and the like to a high voltage of several hundred volts. Alternatively, the EHC 400 may be directly connected to the battery 600 without involving the PCU 500, or may be indirectly connected to the battery 600 through a switching circuit, a relay circuit, or the like.

The battery 600, which is an example of the "electric storage device" according to the present invention, is a rechargeable battery that functions as a supply source of the electric power to drive the motor generator MG1 and the motor generator MG2. The battery 600 is appropriately charged by an external power source 20 that is disposed outside of the hybrid vehicle 10 (that is, an example of the "external power source", according to the present invention). The battery 600 stores not only the electric power that is generated by each of the motor generators but also the electric power that is supplied from the external power source 20. Accordingly, the hybrid vehicle 10 is configured as a so-called PHV.

A state of charge (SOC) sensor 610 is attached to the battery 600. The SOC sensor 610 detects an SOC of the battery 600 (in this embodiment, the SOC is an index value that defines an electric storing state of the battery 600, and defines a value that corresponds to a completely discharged state as 0(%) and a value that corresponds to a fully charged state as 100(%)). The SOC sensor 610 is electrically connected to the ECU 100. The ECU 100 refers to the detected SOC at constant or variable intervals.

The charge plug 700 is a metal plug that is electrically connected to an input terminal of the relay circuit 800 and is also electrically connected to the external power source 20. The external power source 20 may be a household power source at 100 V or infrastructure equipment that is installed in an infrastructure facility (such as a service station) in a city or a suburban area. The external power source 20 is not limited in terms of its physical, mechanical, mechanistic, electric, or chemical mode.

The relay circuit 800 is a switching circuit that selectively switches an electric connection state between an input terminal of the charge plug 700 and an output terminal of the battery 600 in a binary manner (the disconnected state is shown in FIG. 1). The relay circuit 800 is electrically connected to the ECU 100, and the above connection state is controlled by the ECU 100. In a state where the input terminal of the charge plug 700 and the output terminal of the battery 600 are electrically connected (hereinafter referred to as an "ON state" appropriately), the battery 600 is electrically connected to the charge plug 700. If the charge plug 700 is connected to the external power source 20 in this state, the battery 600 is automatically energized and charged. Meanwhile, in a state where the input terminal of the charge plug 700 and the output terminal of the battery 600 are not electrically connected (hereinafter referred to as an "OFF state" appropriately), the battery 600 is electrically disconnected from the charge plug 700. Accordingly, regardless of whether or not the charge plug 700 is connected to the external power source 20, the battery 600 is not energized.

The accelerator operation amount sensor 900 detects the accelerator operation amount Ta of an accelerator pedal (not shown) in the hybrid vehicle 10. The accelerator operation amount sensor 900 is electrically connected to the ECU 100. The ECU 100 refers to the detected accelerator operation amount Ta at constant or variable intervals.

The vehicle speed sensor 1000 detects a vehicle speed V of the hybrid vehicle 10. The vehicle speed sensor 1000 is electrically connected to the ECU 100. The ECU 100 refers to the detected vehicle speed V at constant or variable intervals.

The hybrid vehicle 10 can run in an EV mode in which only the power from the motor generator MG2 is used. Especially since the battery 600 stores the electric power from the external power source 200, the hybrid vehicle 10 can mostly and usually run in the EV mode. This tends to result in a reduced operation frequency of the engine 200. Needless to say, the low operation frequency of the engine 200 is preferable when considering the long-term exhaust emissions of the hybrid vehicle 10. Meanwhile, when the operation frequency of the engine 200 is low, the engine 200 always has to start from a cold state. Accordingly, in the hybrid vehicle 10, the EHC 400 has to be energized almost every time a start-up request of the engine 200 is made. In other words, until the three-way catalyst 216, which is disposed downstream of the EHC 400, is heated by a heat load of the exhaust gases to reach a temperature in a catalyst activation temperature region, the exhaust gases are mainly purified by the EHC 400.

Here, the exhaust gases contain water vapor. When the exhaust pipe 215 is at low temperature, a wall of the exhaust pipe 215 takes heat from the water vapor, and the water vapor is condensed in the exhaust pipe 215. Condensed water, which is generated by this condensation, is formed on the wall of the exhaust pipe 215 to cause dew condensation in the exhaust pipe 215. The EHC 400 is disposed in the exhaust pipe 215, and the condensed water is also formed on the EHC 400. That is, condensation may also occur in the EHC 400. Since the hybrid vehicle 10 is the PHV, such condensation is more likely to occur than a regular hybrid vehicle.

As it has already been described, the EHC 400 is energized when the drive voltage Vd is applied between the positive and negative electrodes. However, when the EHC 400 is covered by water to such a degree that the condensed water covers the positive electrode 450 and the case 410, the positive electrode 450 and the case 410 become electrically conductive. Consequently, the electric leakage may occur. The drive voltage Vd of the EHC 400 during the normal operation is set high at approximately 200 V in order to accelerate the temperature increase of the EHC carrier 430 with the large thermal capacity. Therefore, the electric leakage as described above should ideally be forestalled. Or, even if it is impossible to forestall the electric leakage, the electric leakage should be dealt as quickly as possible. Meanwhile, as described above, the EHC 400 takes a role in reducing the exhaust emissions upon the activation of the engine 200. Thus, if the prevention of such electric leakage is given priority to unreasonably inhibit the energization when an energizing request is made, deterioration in the exhaust emissions is unavoidable. In other words, when the EHC is installed in the hybrid vehicle, it is necessary to absolutely prevent the electric leakage and to assure the energization of the EHC whenever the energization is required.

Figure 4:
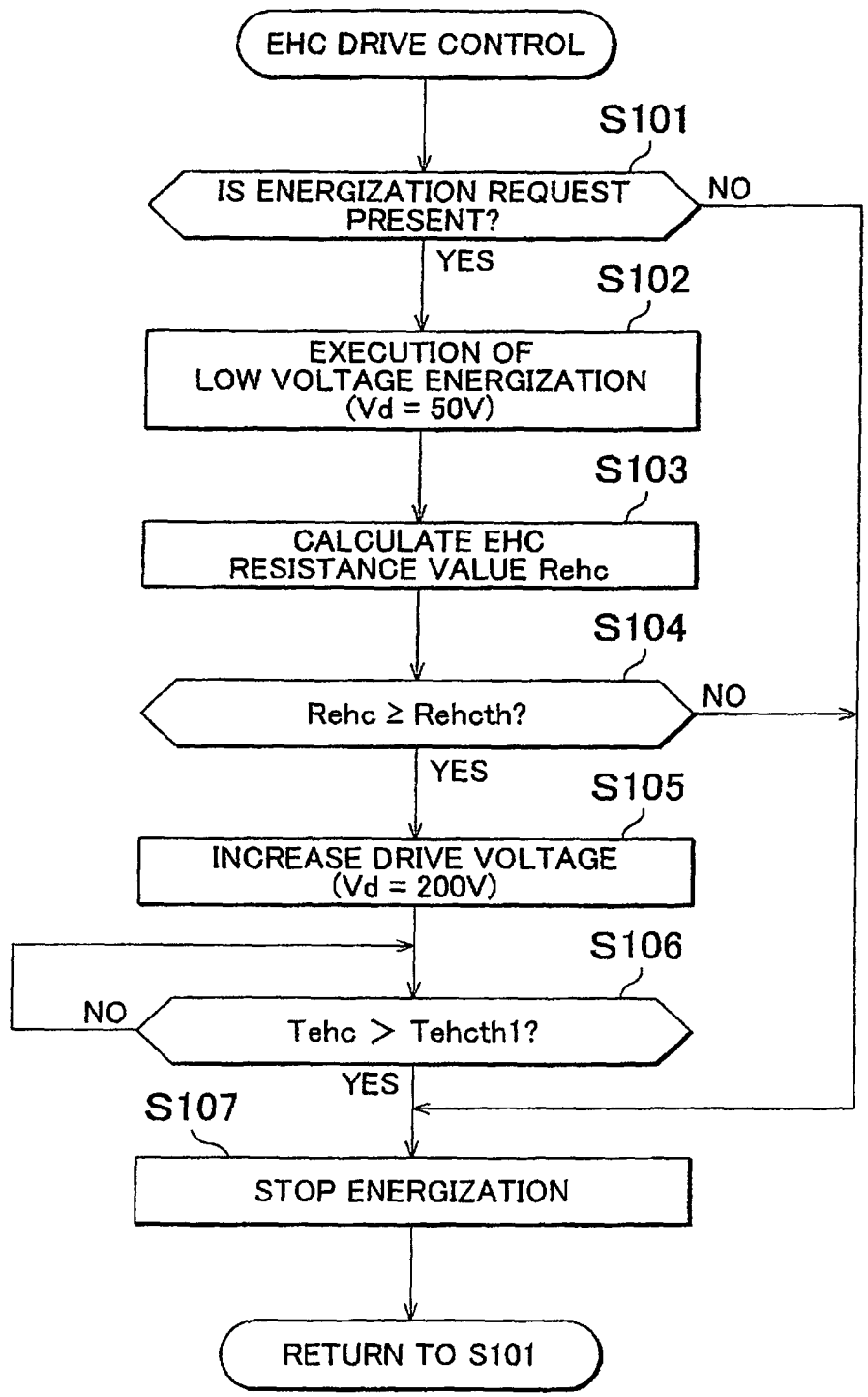
FIG. 4 is a flow chart of EHC drive control that is executed by the ECU.

In the hybrid vehicle 10, EHC drive control that is executed by the ECU 100 solves the above issue. Now, the EHC drive control will be described in detail with reference to FIG. 4. FIG. 4 is a flow chart of the EHC drive control.

In FIG. 4, the ECU 100 determines whether or not the energization of the EHC is requested (step S101). The energization of the EHC 400 may be requested when the start-up request of the engine 200 is made. Here, the hybrid vehicle 10 is the PHV, the operation frequency of the engine is significantly low, and thus the engine has to start from the cold state. In view of the above, the energization of the EHC 400 may also be requested upon start-up of the hybrid vehicle 10 (READY on, for example) or during a soak charge by the external power source 20.

If the energization request has not been made (step S101: NO), the ECU 100 stops energizing the EHC 400 (step S107). Specifically, in this case, since the EHC 400 is already in a non-energized state, no special control is executed. On the other hand, if the energization request of the EHC 400 has been made (step S101: YES), the ECU 100 executes the energization of the EHC 400 at a low voltage (step S102).

Here, the low-voltage energization means the energization in which the drive voltage Vd is lower than the drive voltage of 200 V during the normal operation and is a low voltage of 50 V at which a safety regulation on the voltage application is relaxed. Upon the low-voltage energization, the ECU 100 reduces a high voltage of several hundreds volts that is supplied from the battery 600 to 50 V through the drive control of the PCU 500. Then, the ECU 100 applies the reduced voltage to the positive electrode 450.

When the low-voltage energization is executed, the ECU 100 calculates an EHC resistance value Rehc that represents a total electric resistance value of the EHC 400 on the basis of the drive current Id and the drive voltage Vd (that is, 50 V) of the EHC 400 that are periodically monitored through the PCU 500. The EHC resistance value Rehc is an example of the "EHC conductive characteristic" according to the present invention. When the EHC resistance value Rehc is calculated, the ECU 100 determines whether or not the calculated EHC resistance value Rehc is equal to or larger than a reference value Rehcth, which is determined in advance (step S104). The reference value Rehcth is a value that is experimentally adjusted in advance and also a value that corrects and lowers a reference resistance value, which is determined for each value of the drive voltage Vd of the EHC 400 in the abnormal condition, so as to eliminate an error. The reference value Rehcth is also an eigenvalue that is determined in accordance with the structure of the EHC 400.

If the calculated EHC resistance value Rehc is equal to or larger than the reference value Rehcth (step S104: YES), the ECU 100 determines that an electric insulating property between the EHC 400 and the exhaust pipe 215 is maintained and that the EHC 400 is thus in the normal state. The ECU 100 then increases the drive voltage Vd of the EHC 400 to the normal value of 200 V through the drive control of the PCU 500 (step S105). As a result, the EHC 400 generates heat and promotes the temperature increase of the oxidation catalyst that is carried by the EHC carrier 430.

Once the normal drive voltage Vd is applied, the ECU 100 determines whether or not the temperature Tehc of the EHC 400 exceeds a catalyst activation temperature Tehcth1 (approximately 400° C.) that is a reference value (step S106). The hybrid vehicle 10 has two temperature sensors that are an upstream temperature sensor 440 and a downstream temperature sensor 490. The ECU 100 can refer to an upstream EHC temperature Tehc1 and a downstream EHC temperature Tehc2 that are respectively obtained by the upstream temperature sensor 440 and the downstream temperature sensor 490. The EHC temperature Tehc that is compared with the catalyst activation temperature Tehcth1 in step S106 is an average value between the upstream EHC temperature Tehc1 and the downstream EHC temperature Tehc2. However, the EHC temperature Tehc is not necessarily the average value but may be a lower one of the upstream EHC temperature Tehc1 and the downstream EHC temperature Tehc2. When the EHC temperature Tehc is the lower temperature, it is also possible to reliably heat the EHC 400 to the catalyst activation temperature.

During a period when the EHC temperature Tehc has not reached the catalyst activation temperature Tehcth1 (step S106: NO), the ECU 100 keeps energizing the EHC 400. When the EHC temperature Tehc exceeds the catalyst activation temperature Tehcth1 (step S106: YES), the ECU 100 stops energizing the EHC 400 (step S107).

Meanwhile, if the calculated EHC resistance value Rehc is lower than the reference value Rehcth in step S104 (step S104: NO), the ECU 100 determines that the EHC resistance value Rehc deviates from a normal range and that the electric leakage, which is caused by the formation of the condensed water, has occurred (in other words, "it is determined that the EHC is in the electric leakage avoidance request state" according to the present invention). Then, the process proceeds to step S107. Specifically, the drive voltage Vd of the EHC 400 is not increased to the normal voltage of 200 V, and the energization of the EHC 400 is forcibly terminated. In other words, the control in step S107 is an example of the control that "inhibits the energization of the EHC" according to the present invention. After the execution of step S107, the process returns to step S101. Then, a series of the processes are repeatedly executed. The energization control of the EHC is executed as described above.

As described above, with the EHC drive control according to this embodiment, it is possible to accurately detect the presence or absence of the electric leakage as an actual phenomenon by comparing the EHC resistance value Rehc, which is obtained when the low voltage of 50 V for detection of the electric leakage is applied as the drive voltage Vd, with the reference value Rehcth that is determined in advance as the value during the normal operation. Accordingly, it is possible to appropriately inhibit the energization of the EHC 400 on the basis of the presence or absence of the electric leakage, which is accurately detected. In addition, the applied voltage during the detection of the electric leakage is low at 50 V. Thus, even when the electric leakage occurs as the actual phenomenon during a period that is required for the detection of the electric leakage, the impact of the electric leakage can be minimized. Specifically, according to this embodiment, it is possible to reliably prevent failure that is caused by the electric leakage due to the condensed water, and is thus possible to maximize the effect of the EHC in the exhaust gas control.

Figure 5:
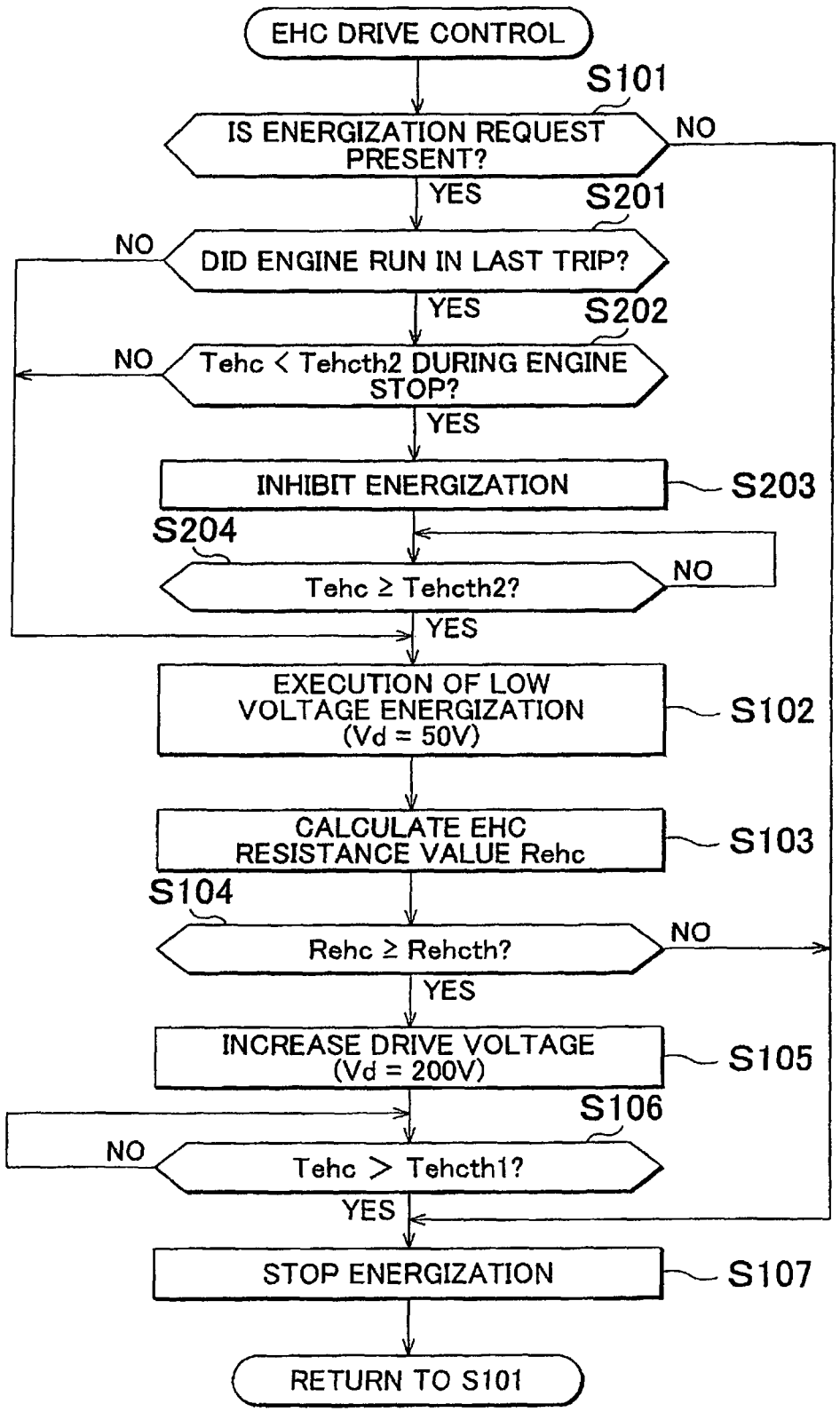
FIG. 5 is a flowchart of the EHC drive control according to a second embodiment of the present invention.

Next, the EHC drive control according to a second embodiment of the present invention will be described in detail with reference to FIG. 5. FIG. 5 is a flow chart of the EHC drive control. The same processes in FIG. 5 as those in FIG. 4 are denoted with the same reference numerals, and their description is not repeated. The system configuration in the second embodiment is the same as that of the hybrid vehicle 10 in the first embodiment.

In FIG. 5, when the energization request of the EHC 400 is made (step S101: YES), the ECU 100 determines whether or not the engine 200 is operated in a last trip (a period from the start-up request of the hybrid vehicle 10 to key off) (step S201). If the engine 200 is not operated in the last trip (step S201: NO), the process proceeds to step S102 by the ECU 100.

On the other hand, if the engine 200 is operated in the last trip (step S201: YES), the ECU 100 determines whether or not the EHC temperature Tehc, which has been previously described, during the engine stop (that is an example of the "heat load condition" according to the present invention") is lower than the reference value Tehth2 (step S202). The value of the temperature Tehc during the engine stop is stored in advance in the RAM when the engine stops in the last trip. If the engine is operated for plural times during one trip, the temperature Tehc during the last operation of the engine is stored. Meanwhile, the reference value Tehcth2 is set as the EHC temperature at which the condensed water can sufficiently be evaporated, and is set at 100+a (° C.).

If the temperature Tehc during the engine stop is equal to or higher than the reference value Tehcth2 (step S202: NO), the process proceeds to step S102 by the ECU 100. On the other hand, if the temperature Tehc is lower than the reference value Tehcth2 (step S202: YES), the EUC 100 inhibits the energization of the EHC 400 before the EHC 400 is energized (step S203).

When the energization of the EHC 400 is inhibited, the ECU 100 determines whether or not the present EHC temperature Tehc is equal to or higher than the reference value Tehcth2 (step S204). If the EHC temperature Tehc is lower than the reference value Tehcth2 (step S204: NO), the ECU 100 inhibits the energization of the EHC 400. If the EHC temperature Tehc becomes equal to or higher than the reference value Tehcth2 (step S204: YES), the process proceeds to step S102 by the ECU 100. When step S102 is executed after various processes, the same control as that in the first embodiment is executed.

As described above, according to this embodiment, if the engine 200 is operated in the last trip, and if the EHC temperature Tehc during the engine stop is lower than the reference value Tehcth2 that can determine the evaporation of the condensed water, it is determined that dew is formed in the EHC 400 by the condensed water or that the EHC 400 is covered with water or in the wet condition. Accordingly, in order to prevent the electric leakage (that is, it is determined that the EHC is "in the electric leakage avoidance request state" according to the present invention), the energization of the EHC 400 is inhibited. Therefore, it is possible to prevent failure that is caused by the application of the low drive voltage Vd in a condition where the electric leakage may occur.

In this embodiment, the temperature Tehc that is obtained during the engine stop in the last trip is compared with the reference value Tehcth2. However, the temperature Tehc may be the maximum value of Tehc from the last trip in a heat load condition under which the comparison is made. This is because it is considered that the condensed water can be evaporated during a period when Tehc exceeds the reference value.

Meanwhile, it is determined whether or not the electric leakage avoidance request is made on the basis of such a heat load condition for a preventive purpose. Thus, it does not necessarily correspond to the actual occurrence of the electric leakage. Considering the above, in this embodiment, if the EHC temperature Tehc reaches the reference value Tehcth2 at which it is determined that the evaporation of dew condensation water is sufficiently progressed, the inhibition of the energization is cancelled. Then, the electric leakage is detected on the basis of the actual electric resistance value as in the first embodiment. Therefore, it is possible to detect the electric leakage with deep consideration in safety, and to obtain the maximum benefit of emission reduction by the EHC 400.

Figure 6:
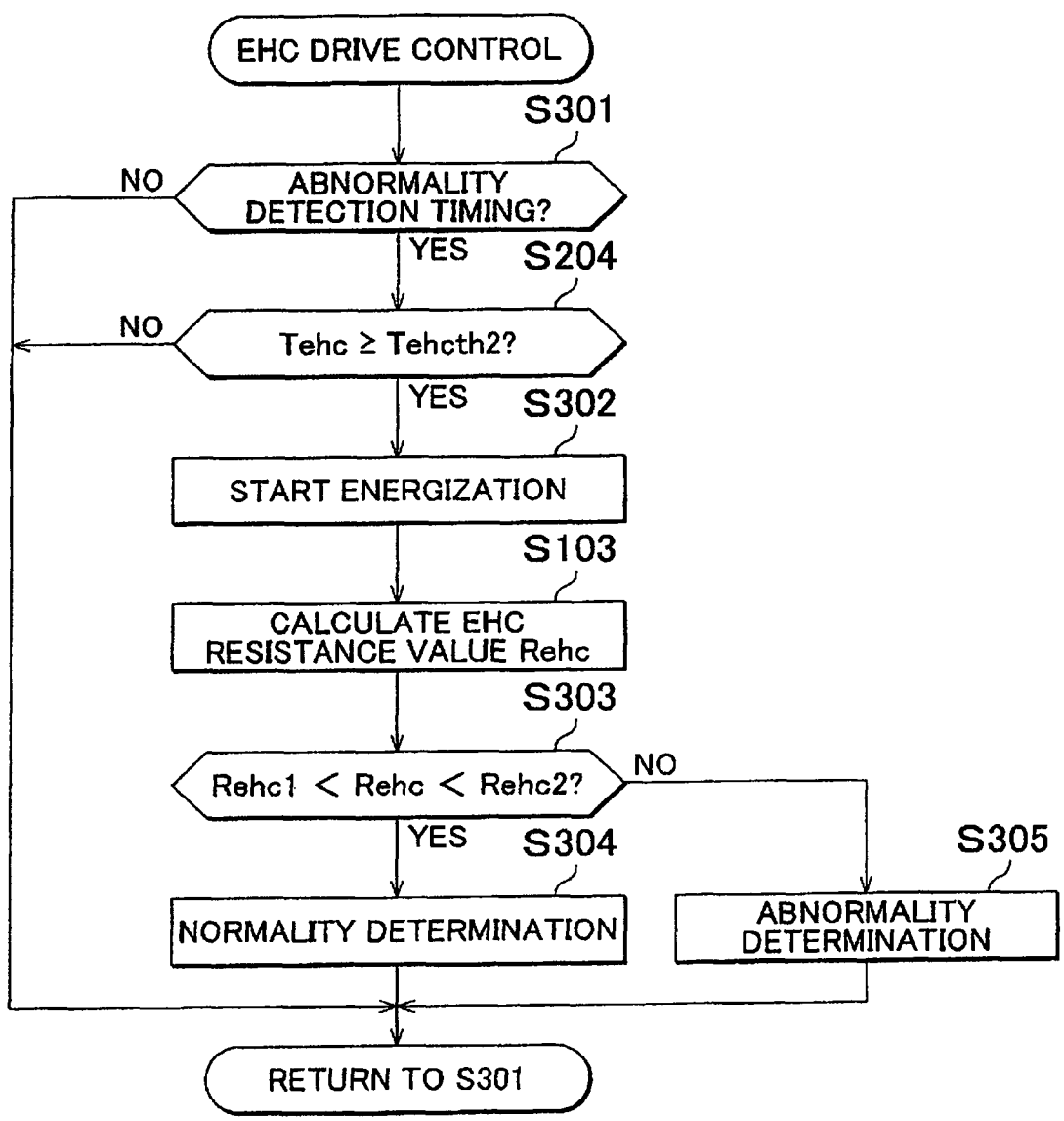
FIG. 6 is a flowchart of the EHC drive control according to a third embodiment of the present invention.

Next, the EHC drive control according to a third embodiment of the present invention will be described in detail with reference to FIG. 6. FIG. 6 is a flow chart of the EHC drive control. The same processes in FIG. 6 as those in FIG. 4 or FIG. 5 are denoted with the same reference numerals, and their description is not repeated. In this embodiment, the system configuration in the third embodiment is the same as that of the hybrid vehicle 10 in the first embodiment.

In FIG. 6, the ECU 100 determines whether or not the present period corresponds to abnormality detection timing (step S301). The abnormality detection timing is determined on the basis of an elapsed time period since the last detection of an abnormality. In other words, the EHC drive control in the third embodiment is executed at specified intervals in parallel with the EHC drive control that is described in the first and the second embodiments.

If the present period is not the abnormality detection timing (step S301: NO), the ECU 100 returns the process to step S301. On the other hand, if the present period corresponds to the abnormality detection timing (step S301: YES), the ECU 100 determines whether or not the EHC temperature Tehc is equal to or higher than the above reference value Tehcth2 (step S204). If the EHC temperature Tehc is lower than the reference value Tehcth2 (step S204: NO), the process returns to step S301 by the ECU 100.

On the other hand, if the EHC temperature Tehc is equal to or higher than the reference value Tehcth2 (step S204: YES), the ECU 100 starts energizing the EHC 400 (step S302). At this point, the drive voltage Vd that is applied to the EHC 400 may be the above low voltage or may be a voltage of another value. When the energization is initiated, the ECU 100 determines whether or not the EHC resistance value Rehc that is calculated in the same manner as that described above is within the normal range that is defined by a lower limit Rehc1 and an upper limit Rehc2 (step S303).

If the calculated EHC resistance value Rehc is higher than the lower limit Rehc1 and lower than the upper limit Rehc2 and thus within the normal range (step S303: YES), the ECU 100 determines that the EHC 400 is in the normal condition (step S304). On the other hand, if the calculated EHC resistance value Relic is equal to or lower than the lower limit Rehc1 or is equal to or higher than the upper limit Rehc2 (step S303: NO), the ECU 100 determines that the EHC 400 is in the abnormal condition (step S305). After either step S304 or step S305 is executed, the process returns to step S301. The EHC drive control is executed as described above.

As described above, according to the EHC drive control in this embodiment, in the situation where it is determined on the basis of the same principle as that in the second embodiment that the electric leakage, which is caused by the condensed water, does not occur in the EHC 400, the EHC 400 is energized, and it is determined whether or not the EHC resistance value Rehc is in the normal range. In a situation where the possibility of the electric leakage that is cased by the condensed water can be eliminated, when the EHC resistance value deviates from the normal range, it is possible to determine that failure other than dew formation by the condensed water is present in the EHC 400. Therefore, the system configuration in this embodiment is beneficial in a practical manner in that it is possible to inhibit the occurrence of failure other than the electric leakage caused by dew formation in the EHC 400. As described above, in the third embodiment, it is possible to detect the abnormality that differs from those detected in the first and second embodiments. In view of this advantage, the system configuration of the third embodiment is preferred because the EHC 400 can be operated with deep consideration in safety when the drive control of the EHC 440 is executed concurrently with the EHC drive control in the first and second embodiments.

In the above embodiments, the hybrid vehicle 10 is an example of the "vehicle" according to the present invention. However, the "vehicle" according to the present invention is not limited to a hybrid vehicle and can be a vehicle that only has the engine 200 as a power source, for example. In this case, it is also determined whether or not the EHC is in the electric leakage avoidance request state, and thus the "vehicle" can have the same benefits as those described above.

The present invention is not limited to the embodiments described above and can be variously modified within the gist or thought of the present invention which can be understood from the claims and the entire specification, and a vehicle control device involving such a modification is also included in the technical scope of the present invention. For example, it is possible to determine whether or not the EHC is in the electric leakage avoidance request state on the basis of an operation period of the engine 200 in the last trip if the engine 200 is operated in the last trip. In this case, if the operation period of the engine 200 in the last trip is longer than a specified operation period, it is determined that the EHC is in the electric leakage avoidance request state.

The vehicle control device according to the present invention may be installed in a vehicle with the EHC.

The invention claimed is:

1. A control device for a vehicle comprising:
an internal combustion engine;
an electrically heated catalyst that is disposed in an exhaust passage of the internal combustion engine, that purifies exhaust gases introduced into the exhaust passage, and that is heated by energization;
an energizing device that supplies electric power to the electrically heated catalyst;
an identifying device that identifies a heat load condition of the electrically heated catalyst before the energizing device energizes the electrically heated catalyst;
a determining device that determines whether or not the electrically heated catalyst is in a specified electric leakage avoidance request state on the basis of the identified heat load condition of the electrically heated catalyst; and
an inhibiting device that inhibits the energization when it is determined that the electrically heated catalyst is in the electric leakage avoidance request state, wherein
the identifying device identifies a maximum value of temperature of the electrically heated catalyst during a last operation period of the internal combustion engine as the heat load condition; and
the determining device determines that the electrically heated catalyst is in the electric leakage avoidance request state when the identified maximum value is equal to or lower than a specified value.

2. The control device according to claim 1, wherein
the identifying device identifies a conductive characteristic of the electrically heated catalyst before the energizing device energizes the electrically heated catalyst; and
the determining device determines whether or not the electrically heated catalyst is in the specified electric leakage avoidance request state on the basis of the identified conductive characteristic of the electrically heated catalyst and the identified heat load condition of the electrically heated catalyst.

3. The control device according to claim 2, wherein the identifying device identifies the conductive characteristic upon application of a specified low voltage to the electrically heated catalyst.

4. The control device according to claim 3, wherein the specified low voltage is lower than a voltage at which the energization is conducted to heat a catalyst.

5. The control device according to claim 2, wherein:
the conductive characteristic is an electric resistance value of the electrically heated catalyst; and
the determining device determines that the electrically heated catalyst is in the electric leakage avoidance request state when the identified electric resistance is equal to or lower than a specified value.

6. The control device according to claim 1, wherein:
the identifying device identifies duration of a last operation period of the internal combustion engine as the heat load condition; and
the determining device determines that the electrically heated catalyst is in the electric leakage avoidance request state when the identified operation period is equal to or longer than a specified operation period.

7. The control device according to claim 2, wherein:
the identifying device identifies the electric resistance value and the temperature of the electrically heated catalyst as the conductive characteristic and the heat load condition, respectively, and
the determining device determines that the electrically heated catalyst is in the electric leakage avoidance request state when the identified temperature is equal to or higher than a specified value and the identified electric resistance value is equal to or lower than a specified value.

8. The control device according to claim 1, wherein:
the vehicle is a hybrid vehicle that includes: at least one rotating motor that functions as a power source in conjunction with the internal combustion engine; and a rechargeable electric storage device that functions as an electric power source of the rotating motor; and
electric power that is required for the energization is supplied from the electric storage device.

9. A method for controlling a vehicle that includes: an internal combustion engine; an electrically heated catalyst that is disposed in an exhaust passage of the internal combustion engine, that purifies exhaust gases introduced into the exhaust passage, and that is heated by energization; and an energizing device that supplies electric power to the electrically heated catalyst, the method comprising:
identifying a heat load condition of the electrically heated catalyst before the energization is initiated by the energizing device;
determining whether or not the electrically heated catalyst is in a specified electric leakage avoidance request state on the basis of the identified heat load condition of the electrically heated catalyst; and
inhibiting the energization when it is determined that the electrically heated catalyst is in the electric leakage avoidance request state, wherein
the identifying step identifies a maximum value of temperature of the electrically heated catalyst during a last operation period of the internal combustion engine as the heat load condition; and the determining step determines that the electrically heated catalyst is in the electric leakage avoidance request state when the identified maximum value is equal to or lower than a specified value.

10. The method according to claim 9, wherein the identifying step identifies a conductive characteristic of the electrically heated catalyst before the energization is initiated by the energizing device; and the determining step determines whether or not the electrically heated catalyst is in the specified electric leakage avoidance request state on the basis of the identified conductive characteristic of the electrically heated catalyst and the identified heat load condition of the electrically heated catalyst.

* * * * *